US008885818B2

(12) United States Patent
Boehm et al.

(10) Patent No.: US 8,885,818 B2
(45) Date of Patent: Nov. 11, 2014

(54) AUTHENTICATION OF DATA STREAMS

(75) Inventors: Reinhold Boehm, Nürnberg (DE);
Alexander Groeschel, Nürnberg (DE);
Holger Hoerich, Fürth (DE); Daniel Homm, Nürnberg (DE); Wolfgang A. Schildbach, Nürnberg (DE); Michael Schug, Erlangen (DE); Oliver Watzke, Röthenbach (DE); Martin Wolters, Nürnberg (DE); Thomas Ziegler, Nürnberg (DE)

(73) Assignee: Dolby International AB, Amsterdam Zuidoost (NL)

( * ) Notice: Subject to any disclaimer, the term of this patent is extended or adjusted under 35 U.S.C. 154(b) by 176 days.

(21) Appl. No.: 13/388,426

(22) PCT Filed: Aug. 6, 2010

(86) PCT No.: PCT/EP2010/004827
§ 371 (c)(1),
(2), (4) Date: Feb. 1, 2012

(87) PCT Pub. No.: WO2011/015369
PCT Pub. Date: Feb. 10, 2011

(65) Prior Publication Data
US 2012/0128151 A1 May 24, 2012

Related U.S. Application Data

(60) Provisional application No. 61/232,295, filed on Aug. 7, 2009.

(51) Int. Cl.
*H04L 9/00* (2006.01)
*H04L 29/06* (2006.01)
(Continued)

(52) U.S. Cl.
CPC .... *G11B 20/00086* (2013.01); *G11B 20/00188* (2013.01); *G11B 20/0021* (2013.01);
(Continued)

(58) Field of Classification Search
USPC ......... 380/200–201, 205, 210, 212, 217, 232, 380/255, 269, 42, 28–30; 713/161, 168, 713/170, 176, 179–181, 189, 193; 726/2, 726/26–33
See application file for complete search history.

(56) References Cited

U.S. PATENT DOCUMENTS 5,463,424 A   10/1995 Dressler
5,646,997 A    7/1997 Barton
(Continued)

FOREIGN PATENT DOCUMENTS

EP   0987855   3/2000
EP   1652383   12/2007
(Continued)

OTHER PUBLICATIONS

Information Technology—Coding of Audio-Visual Objects—Part 3: Audio for MPEG4-AAC, ISO/IEC 14496-3 (2005).
(Continued)

*Primary Examiner* — Kambiz Zand
*Assistant Examiner* — Trong Nguyen

(57) ABSTRACT

The present document relates to techniques for authentication of data streams. Specifically, the present document relates to the insertion of identifiers into a data stream, such as a Dolby Pulse, AAC or HE AAC bitstream, and the authentication and verification of the data stream based on such identifiers. A method and system for encoding a data stream comprising a plurality of data frames is described. The method comprises the step of generating a cryptographic value of a number N of successive data frames and configuration information, wherein the configuration information comprises information for rendering the data stream. The method then inserts the cryptographic value into the data stream subsequent to the N successive data frames.

22 Claims, 7 Drawing Sheets

(51) Int. Cl.
<table>
<tr><td>H04L 9/32</td><td>(2006.01)</td></tr>
<tr><td>G11B 20/00</td><td>(2006.01)</td></tr>
<tr><td>H04H 60/73</td><td>(2008.01)</td></tr>
<tr><td>H04N 21/44</td><td>(2011.01)</td></tr>
<tr><td>H04N 21/234</td><td>(2011.01)</td></tr>
<tr><td>H04N 21/835</td><td>(2011.01)</td></tr>
<tr><td>H04H 20/31</td><td>(2008.01)</td></tr>
<tr><td>H04N 21/254</td><td>(2011.01)</td></tr>
<tr><td>H04N 21/435</td><td>(2011.01)</td></tr>
<tr><td>H04N 21/6332</td><td>(2011.01)</td></tr>
<tr><td>H04H 60/37</td><td>(2008.01)</td></tr>
<tr><td>H04N 21/81</td><td>(2011.01)</td></tr>
<tr><td>H04N 21/462</td><td>(2011.01)</td></tr>
<tr><td>H04N 21/654</td><td>(2011.01)</td></tr>
<tr><td>H04N 21/235</td><td>(2011.01)</td></tr>
</table>

(52) U.S. Cl.
CPC ......... *H04H 60/73* (2013.01); *H04N 21/44016* (2013.01); *H04L 65/602* (2013.01); *H04N 21/23424* (2013.01); *H04N 2201/50* (2013.01); *H04N 21/835* (2013.01); *H04H 20/31* (2013.01); *H04N 21/2541* (2013.01); *H04N 21/435* (2013.01); *G11B 20/00007* (2013.01); *G11B 20/00173* (2013.01); *H04N 21/6332* (2013.01); *G11B 20/00166* (2013.01); *G11B 2020/00028* (2013.01); *H04H 60/37* (2013.01); *H04N 21/8106* (2013.01); *H04N 21/462* (2013.01); *H04N 21/654* (2013.01); *H04N 21/235* (2013.01)
USPC .............................. 380/42; 713/161; 713/181

(56) References Cited

U.S. PATENT DOCUMENTS

<table>
<tr><td>5,915,027</td><td>A</td><td></td><td>6/1999</td><td>Cox et al.</td><td></td></tr>
<tr><td>6,009,176</td><td>A</td><td></td><td>12/1999</td><td>Gennaro et al.</td><td></td></tr>
<tr><td>6,904,089</td><td>B1</td><td>*</td><td>6/2005</td><td>Sueyoshi et al.</td><td>375/240</td></tr>
<tr><td>7,058,815</td><td>B2</td><td></td><td>6/2006</td><td>Morin</td><td></td></tr>
<tr><td>7,197,156</td><td>B1</td><td></td><td>3/2007</td><td>Levy</td><td></td></tr>
<tr><td>7,417,989</td><td>B1</td><td></td><td>8/2008</td><td>Doran</td><td></td></tr>
<tr><td>7,752,449</td><td>B1</td><td>*</td><td>7/2010</td><td>Chapman</td><td>713/179</td></tr>
<tr><td>8,539,608</td><td>B1</td><td>*</td><td>9/2013</td><td>Troxel</td><td>726/30</td></tr>
<tr><td>2002/0178368</td><td>A1</td><td>*</td><td>11/2002</td><td>Yin et al.</td><td>713/186</td></tr>
<tr><td>2003/0182246</td><td>A1</td><td></td><td>9/2003</td><td>Johnson</td><td></td></tr>
<tr><td>2004/0015697</td><td>A1</td><td></td><td>1/2004</td><td>De Queiroz</td><td></td></tr>
<tr><td>2004/0015698</td><td>A1</td><td></td><td>1/2004</td><td>Okada</td><td></td></tr>
<tr><td>2005/0050332</td><td>A1</td><td>*</td><td>3/2005</td><td>Serret-Avila et al.</td><td>713/176</td></tr>
<tr><td>2006/0136728</td><td>A1</td><td></td><td>6/2006</td><td>Gentry</td><td></td></tr>
<tr><td>2006/0195886</td><td>A1</td><td></td><td>8/2006</td><td>Ashley</td><td></td></tr>
<tr><td>2008/0005558</td><td>A1</td><td></td><td>1/2008</td><td>Hadley</td><td></td></tr>
<tr><td>2008/0010466</td><td>A1</td><td>*</td><td>1/2008</td><td>Hopper</td><td>713/187</td></tr>
<tr><td>2008/0037783</td><td>A1</td><td></td><td>2/2008</td><td>Kim</td><td></td></tr>
<tr><td>2008/0301461</td><td>A1</td><td></td><td>12/2008</td><td>Coulier et al.</td><td></td></tr>
<tr><td>2010/0083344</td><td>A1</td><td></td><td>4/2010</td><td>Schildbach</td><td></td></tr>
<tr><td>2011/0051800</td><td>A1</td><td></td><td>3/2011</td><td>Schug</td><td></td></tr>
<tr><td>2011/0208528</td><td>A1</td><td></td><td>8/2011</td><td>Schildbach</td><td></td></tr>
<tr><td>2012/0019723</td><td>A1</td><td></td><td>1/2012</td><td>McGrath</td><td></td></tr>
</table>

FOREIGN PATENT DOCUMENTS

<table>
<tr><td>EP</td><td>1874056</td><td>1/2008</td></tr>
<tr><td>JP</td><td>2004-364263</td><td>12/2004</td></tr>
<tr><td>JP</td><td>2005-318068</td><td>11/2005</td></tr>
<tr><td>JP</td><td>2007-67856</td><td>3/2007</td></tr>
<tr><td>JP</td><td>2009-81560</td><td>4/2009</td></tr>
<tr><td>JP</td><td>2009-093506</td><td>4/2009</td></tr>
<tr><td>JP</td><td>2009-152713</td><td>7/2009</td></tr>
<tr><td>RU</td><td>2308077</td><td>10/2007</td></tr>
<tr><td>RU</td><td>2351013</td><td>3/2009</td></tr>
<tr><td>WO</td><td>0054453</td><td>9/2000</td></tr>
<tr><td>WO</td><td>0075925</td><td>12/2000</td></tr>
<tr><td>WO</td><td>2011/110525</td><td>9/2001</td></tr>
<tr><td>WO</td><td>03024020</td><td>3/2003</td></tr>
<tr><td>WO</td><td>2005/011279</td><td>2/2005</td></tr>
<tr><td>WO</td><td>2005011279</td><td>2/2005</td></tr>
<tr><td>WO</td><td>2009/046438</td><td>4/2009</td></tr>
<tr><td>WO</td><td>2011/073201</td><td>6/2011</td></tr>
<tr><td>WO</td><td>2011/100155</td><td>8/2011</td></tr>
</table>

OTHER PUBLICATIONS

"Generic Coding of Moving Pictures and Associated Audio Information"—Part 7: Advanced Audio Coding (AAC) for MPEG-2 AAC ISO/IEC 13818-7 (2003).

Yoshioka, T. et al. "An Implementation of Partial Integrity Assurance Technology: PIAT for Audio and Video Data (II)", IEICE Technical Report, Jul. 17, 2008, vol. 108, No. 161, pp. 37-44.

* cited by examiner

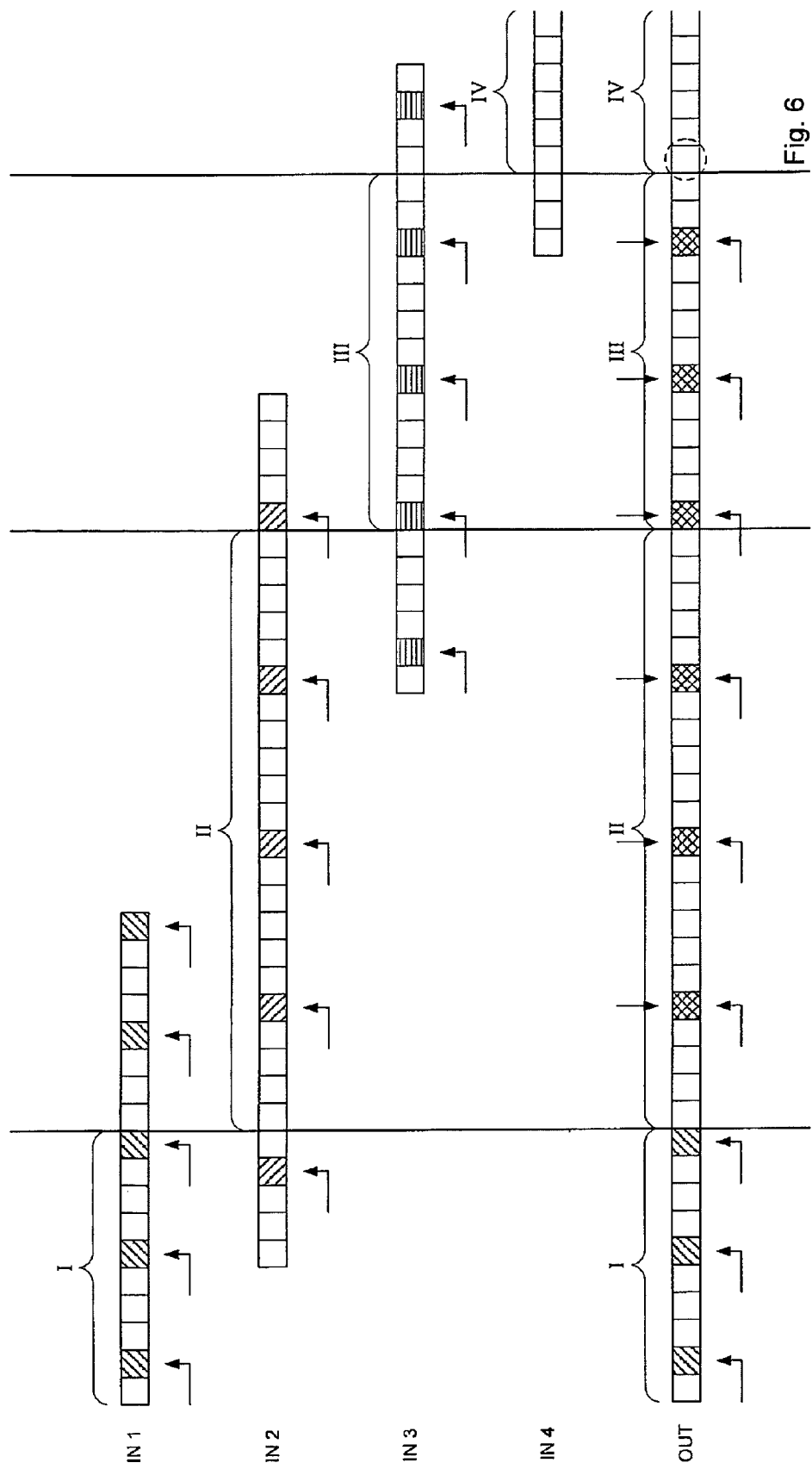

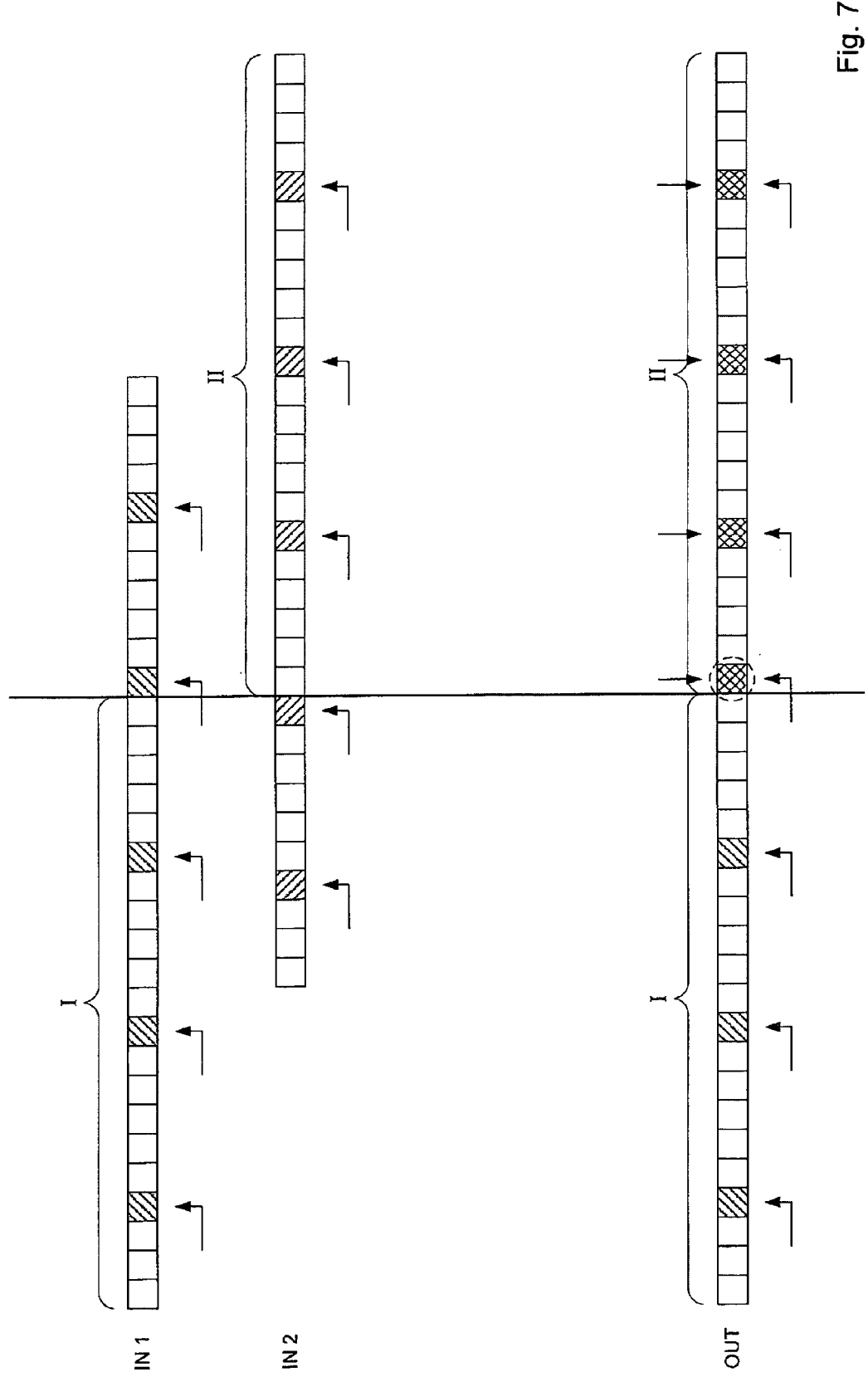

AUTHENTICATION OF DATA STREAMS

TECHNICAL FIELD

The present invention relates to techniques for authentication and verification of data streams. Specifically, the invention relates to the insertion of identifiers into a data stream, such as a Dolby Pulse, AAC or HE AAC bitstream, and the authentication and verification of the data stream based on such an identifier.

BACKGROUND

With the increasing proliferation of digital TV and radio systems, data streams, comprising e.g. video data and/or audio data, are broadcasted more and more frequently. In addition to the actual video and/or audio content such data streams further comprise metadata which allows e.g. for receiver-side control of program loudness and dynamic range, as well as for the control of stereo downmix and other features.

In typical network scenarios, video frames and/or audio frames and their associated metadata are encoded at a broadcasting headend system. For this purpose various encoding schemes such as Dolby E, Dolby Digital, AAC, HE AAC, DTS or Dolby Pulse may be used. Some of these encoding schemes, notably Dolby Pulse, AAC and HE AAC, are particularly well suited for the transmission over various transmission media, such as radio (e.g. FM frequency band, DVB/T, ATSC), twisted copper (DSL), coaxial cables (e.g. CATV) or optical fibers. The receiver, e.g. a TV set, a radio receiver, a personal computer or a set-top box, has an appropriate decoder and provides the decoded media stream. In addition, the receiver usually provides control features which are signaled via the metadata accompanying the video and/or audio data.

Examples of coding/decoding schemes are specified in ISO/IEC 14496-3 (2005) "Information technology—Coding of audio-visual objects—Part 3: Audio" for MPEG-4 AAC and in ISO/IEC 13818-7 (2003) "Generic Coding of Moving Pictures and Associated Audio information—Part 7: Advanced Audio Coding (AAC)" for MPEG-2 AAC which are incorporated herein by reference.

Several techniques for authentication and/or identification are known. Some rely on embedding authentication and/or identification data within coded multimedia data. These techniques are also known as watermarking and are specifically designed for copyright protection. A further technique for authentication and/or identification is the digital signature, where separate authentication data is provided along with data files such as Emails, and used at a decoder for authentication and identification purposes.

In order for the receiver of data streams to be able to identify the encoder of the data stream, it is desirable to provide authentication means along with the data stream. It may also be beneficial to verify the integrity of the data stream. In addition, it may be beneficial to ensure the correct configuration of the receiver with regards to the data stream that is to be played back or processed. Furthermore, it may be beneficial to allow for the implementation of value added services or special control functionalities for data streams which have been properly authenticated and/or verified. These and other issues are addressed in the present patent document.

SUMMARY

The proposed method and system make use of an identifier which may be provided as metadata within a data stream. Such data streams are preferably data streams which are transmitted over a wireline or wireless transmission medium, but the data streams could also be provided on a data storage medium, such as a CD, DVD or flash memory. The identifier enables a decoder at the receiving side to verify whether or not a data stream that it receives is from a trusted encoder, i.e. a legitimate encoder at the transmitting and/or encoding side. Such verification may be particularly beneficial if a decoder is compatible with different types of encoders. By way of example, a Dolby Pulse decoder may be compatible with a HE-AAC version 2 encoder. In such a scenario, it may be desirable to enable a Dolby Pulse decoder to provide certain additional non-standard or non-mandatory features only if the traffic, i.e. data streams, originates from appropriate Dolby Pulse encoders. By using such an identifier, a Dolby Pulse decoder would be able to differentiate between a data stream or bitstream generated by an appropriate Dolby Pulse encoder and a data stream or bitstream generated by any arbitrary HE-AACv2 compliant encoder. As such, it could be ensured that the additional features, e.g. the use of dynamic metadata, are only considered by the decoder if the data stream originates from a trusted encoder. By doing this, the correct functioning of additional features can be ensured.

A further benefit of the identifier is that it may enable a decoder to verify that a bitstream has been received in a correct manner and that the bitstream was not modified or tampered with during transmission. In other words, the identifier enables the decoder to verify the integrity of the received bitstream.

Furthermore, the identifier may be used to ensure that the decoder is set to the right processing, e.g. play back, configuration, in order to appropriately render the media/multimedia signal. By way of example, such configuration may be directed at the sampling frequency at which the media signal is played back. The configuration may also be directed at the channel configuration, e.g. 2 channel stereo, different surround sound settings, etc., which is to be used for play back. A further configuration aspect may be directed at the frame length, e.g. 1024 sample frames or 960 sample frames in the case of AAC, which is used in the particular coding scheme.

Apart from encoder identification and authentication purposes, the identifier may be used to verify the authenticity of the payload of the data stream. For this purpose the identifier should not be easily forgeable and a manipulation of the protected segment should be identifiable. Furthermore, it is desirable that a decoder identifies the authenticity of a bitstream at relatively short time intervals. It is preferable that the maximum time until a decoder or decoding device is able to identify an authentic bitstream when streaming does not exceed 1 second. In addition, the complexity introduced by the verification of the identifier in the decoder should be kept low, i.e. the decoder complexity increase should be negligible. Finally, the transmission overhead introduced by the identifier should be kept low.

According to an embodiment, the above benefits may be achieved by making use of a cryptographic value or identifier derived according to the following method. The identifier may be determined at the encoder by applying a one-way function to a group of one or more data frames. A frame typically comprises the data associated with a certain segment of an audio stream and/or a video stream, e.g. a segment comprising a given number of samples of the media stream. By way of example, a frame of an audio stream may comprise 1024 samples of audio data and the corresponding metadata.

As mentioned above, for the purpose of determining an identifier a certain number of frames are grouped. The number of frames in each group may be chosen by the encoder and typically does not have to be known in advance by the decoder. The one-way function is preferably the HMAC-MD5 (hash message authentication code) cryptographic hash function, even though other hash functions such a SHA-1 may be used instead of MD5. A possible criterion for selecting an appropriate cryptographic hash function may be its size, which should be kept small, in order to reduce the required transmission overhead. The size of a cryptographic hash function is typically given by its number of bits.

Once the identifier for a group of frames has been calculated using e.g. the HMAC-MD5 procedure, it may be associated with, e.g. inserted into, a frame of the next group of frames. By way of example, the identifier may be written into a data field or a syntactic element of the frame. Preferably, the identifier is inserted into the first frame of the following group of frames. This allows the identifier to be calculated as a one-pass operation without introducing additional latency to the encoder/decoder, which is particularly beneficial for real-time media transmission. The data stream comprising the identifier may then be transmitted to corresponding receivers/decoders.

At a receiver, the inserted identifier may be used for encoder identification, authentication, verification and/or configuration purposes. The receiver typically comprises a decoder which may synchronize to a group of frames, i.e. it may determine frames which comprise an identifier. Based on the distance between two succeeding frames which comprise an identifier, the number of frames per group of frames that were used to calculate the identifier may be determined. In other words, this may allow the decoder to determine the length of the group of frames without notification from the corresponding encoder.

The decoder may calculate the identifier for a received group of frames. The identifiers which are calculated based on the received group of frames may be referred to as the verification identifiers. If it is assumed that the identifiers are inserted into the first frame of a succeeding group of frames, then each group of frames would start with a first frame which comprises an identifier for the previous group of frames and it would end with the frame which directly precedes the next frame which comprises an identifier for the present group of frames. For the present group of frames a verification identifier may be calculated according to the methods outlined above.

In a further step, the decoder may extract the identifier transmitted by the encoder from the respective frame of the subsequent group of frames. Again, if at the encoder the identifiers are inserted into the first frame of a succeeding group of frames, then also the receiver extracts the identifier from this first frame. This identifier, which has been retrieved from the data stream, may be compared with the verification identifier, i.e. the identifier that is calculated by the decoder based on the received data stream. If both identifiers match, the decoder can typically assume that no errors occurred during transmission, the group of frames was received intact, the group of frames was not modified during transmission, and the group of frames is from a trusted and/or legitimate encoder. Additionally, if both identifiers match, the decoder may choose to enable one or more codec specific features or improvements that would not be enabled when an arbitrary bitstream is decoded. By way of example, additional services could be enabled if the decoder identified a Dolby Pulse specific bitstream, whereas such added services would not be available for a standard HE-AAC version 2 encoded bitstream. Nevertheless, the decoder may be enabled to decode the standard HE-AAC version 2 encoded bitstream, however, without using the additional services.

It should be noted that in addition, the identifier may be enabled to ensure that the appropriate configuration for correctly decoding and/or playing back the media stream is set up at the decoder. In such cases, a matching verification identifier and transmitted identifier would indicate that the decoder uses the correct configuration settings.

If, on the other hand, the identifiers, i.e. the verification identifier and the transmitted identifier, do not match, then the decoder would know that an error occurred during transmission, the group of frames was not received intact, the group of frames was modified during transmission, or the group of frames was not from a trusted encoder. In such cases, the decoder may be fully disabled or alternatively specific features or improvements may be disabled.

It should be noted that the identifier may also be used to inform the decoder that the wrong configuration settings have been set. In such cases, a mismatch between the verification identifier and the transmitted identifier could be due to the fact that the decoder uses the wrong configuration settings, even though the group of frames was received intact and from an entrusted encoder. It may be contemplated that in such cases, the decoder may be operable to modify its configuration settings and to determine corresponding verification identifiers until the verification identifier matches the transmitted identifier. This would enable the decoder to actually set its configuration to the requirements of the received bitstream.

In the following different aspects of the proposed method are described. According to a first aspect, a method for encoding a data stream comprising a plurality of data frames is described. The data streams may be audio, video and/or other media and multimedia streams. In particular, the data streams may be Dolby Pulse, AAC or HE-AAC data streams. The data streams are typically organized in data frames which comprise a certain number of data samples and cover a certain segment of the data stream. By way of example, a frame may comprise 1024 samples of an audio signal sampled at a sampling rate of 44.1 kHz, i.e. it covers a segment of about 23 ms. It should be noted that samples may be encoded at constant or variable bit rates, and the actual number of bits within a frame may vary.

The method may comprise the step of grouping a number N of successive data frames to form a first message. The number N of successive data frames is typically chosen with regards to data rate overhead considerations. Usually the overhead decreases with an increasing number N. N is preferably greater than one. Typical values for N are around 20. In a preferred embodiment, N may be selected such that the N successive frames cover 0.5 seconds of a corresponding signal when played back at a corresponding decoder with an appropriate decoder configuration. It should be noted that the step of grouping may comprise concatenating the N successive frames in their natural, i.e. streaming, order.

In a further step the first message may be grouped with configuration information to form a second message. Such configuration information comprises information external to the data stream and it is typically related to the data stream, in particular information for rendering the data stream at a receiver side. The configuration information may comprise information regarding the settings of the respective receiver and/or decoder which should be used to process the data stream. As such configuration information is typically not transmitted or included into the data stream it may also be referred to as out-of-band data. This is opposed to the data stream which may also be referred to as in-band data.

The configuration information may be grouped with the first message in various ways. It may be concatenated with the first message, i.e. it may be placed at the beginning and/or the end of the first message. The configuration information may also be placed at certain positions within the first message, e.g. between some or all of the succeeding frames.

Typical examples for configuration information comprise an indication of a sampling rate which was used to sample the underlying analog media stream. Configuration information may also comprise an indication of a channel configuration of an audio coding system, such as a mono, a two channel stereo or a 5.1 surround sound channel configuration. It may also comprise an indication of the number of samples in a data frame, e.g. 960, 1024 or 2048 samples per data frame.

The method comprises further the step of generating a cryptographic value of the first and/or second message. The cryptographic value may also be referred to as an identifier. This cryptographic value may be generated using a key value and a cryptographic hash function. In particular, the cryptographic value may be generated by calculating an HMAC-MD5 value for the first and/or second message. Furthermore, the generation of the cryptographic value may comprise truncating the HMAC-MD5 value, e.g. truncating to 16, 24, 32, 48 or 64 bits. This may be beneficial in view of reducing the required overhead for the cryptographic value in the data stream.

Furthermore, the method comprises inserting the cryptographic value into the data stream subsequent to the N successive data frames. Preferably, the cryptographic value is inserted in the first frame following the N successive data frames, in order to allow for a fast decoding and encoder authentication and verification at a corresponding decoder. It may be beneficial to also insert a synchronization indication subsequent to the N successive data frames, wherein the synchronization indication indicates that the cryptographic value has been inserted. Such synchronization indication may be placed in the vicinity of the cryptographic value to allow for a convenient extraction of the cryptographic value at a corresponding decoder.

In an exemplary embodiment the data stream is an MPEG4-AAC or MPEG2-AAC stream and the cryptographic value is inserted as a data stream element <DSE>. Such data stream element <DSE> may be inserted at the end of a frame prior to a <TERM> element. Furthermore, the content of such data stream element <DSE> may preferably be aligned to a byte boundary of the data stream, in order to simplify extraction of the data stream element <DSE>, and in particular of the cryptographic value and/or the synchronization indication, at a corresponding decoder.

It should be noted that the step of generating a cryptographic value may preferably be performed iteratively on the individual frames of a group of N successive frames. For this purpose, an intermediate cryptographic value may be generated for each of the N successive frames using a starting state. The starting state may be the intermediate cryptographic value of the previous iteration. By way of example, an intermediate cryptographic value may be generated for the first frame. This intermediate cryptographic value may then be used as the starting state for the generation of an intermediate cryptographic value of the second frame. This process is repeated until an intermediate cryptographic value of the $N^{th}$ frame is generated. This latter intermediate cryptographic value typically represents the cryptographic value of the group of N successive frames. In order to take into account the configuration information, the starting state of the first iteration may be an intermediate cryptographic value of the configuration information.

In a preferred embodiment, the cryptographic value of a block of N successive data frames is generated on the block of N successive data frames comprising the cryptographic value of the previous block of N successive data frames. By doing this, a stream of interconnected cryptographic values may be generated.

According to another aspect, the method may comprise the step of interacting with a video and/or audio encoder of the data stream. This may be implemented by performing the video and/or audio encoding, as well as the generation of the cryptographic value in an integrated manner. In particular, the interaction between the video and/or audio encoder of the data stream and the generation of the cryptographic value may be directed at setting a maximum bit-rate for the video and/or audio encoder such that a bit-rate of the data stream comprising the cryptographic value does not exceed a predetermined value. This may be particularly beneficial if the underlying data stream codec sets an upper bit-rate limit for a complete data stream.

According to a further aspect, a method for verifying a data stream at a decoder and/or receiver is described. It should be noted that the described methods and systems may be applicable in the context of transmitted data streams, as well as data streams provided on a storage medium. As outlined above, the data stream typically comprises a plurality of data frames and a cryptographic value associated with a number N of preceding successive data frames. Reference is made to the considerations made in this document, notably with regards to possible values for N and the structure of the data stream and its frames.

The method comprises the step of extracting the N successive data frames to form a first message. The method may also comprise the step of determining the value N. This may be performed in a data stream which comprises a plurality of N successive data frames and associated cryptographic values. If N successive data frames are referred to as a group of frames, such data stream typically comprises a plurality of groups of frames and a cryptographic value associated with each such group of frames. In such cases, the number N may be determined as the number of frames between two succeeding cryptographic values.

It should be noted that the present group of frames which is used to calculate a second cryptographic value may comprise the cryptographic value of the previous group of frames. Alternatively, the cryptographic value of the previous group of frames and any associated synchronization indication and/or syntactic element may first be removed from the present group of frames before calculating the second cryptographic value. The latter solution may be preferable, in order to prevent changes and discrepancies from propagating from one group of frames to the next.

The method may further comprise the step of grouping the first message with configuration information to form a second message, wherein the configuration information typically comprises information external to the data stream such as for rendering the data stream. The step of grouping and the different aspects with regards to the configuration information have been outlined above. These aspects are equally applicable at the decoder.

The method proceeds by generating a second cryptographic value of the first and/or second message, by extracting the cryptographic value from the data stream and by comparing the cryptographic value with the second cryptographic value. The second cryptographic value may also be referred to as the verification cryptographic value or the verification identifier.

It should be noted that the second cryptographic value may be generated in an iterative manner, as described in the context of the generation of the cryptographic value.

In a preferred embodiment the cryptographic value has been generated at a corresponding encoder and/or transmitter from the N successive data frames and the configuration information, according to a method corresponding to the method used for generating the second cryptographic value. In other words, the method for generating the cryptographic value at the corresponding encoder corresponds to the method for generating the second cryptographic value at the decoder. In particular, the cryptographic value and the second cryptographic value are generated using a unique key value and/or a unique cryptographic hash function.

Furthermore, the set of N succeeding frames used for generating the cryptographic value at the encoder corresponds to the set of N succeeding frames used for generating the second cryptographic value at the decoder. As mentioned above, the cryptographic value and the second cryptographic value may be determined on the set of N succeeding frames which comprise or which do not comprise the cryptographic value of the preceding set of N succeeding frames. The same rule should be applied at the encoder and at the decoder.

Even if the set of frames used at the encoder and the decoder should be identical, it should be noted that the content of the frames at the encoder and the decoder may differ, e.g. due to modifications incurred during transmission of the frames or due to errors on the storage medium of the data stream.

According to a further aspect, the method may comprise the steps of setting a flag, if the cryptographic value corresponds to the second cryptographic value and/or of providing a visual indication at the receiver and/or decoder if the flag is set. In an analogous manner the flag and/or visual indication may be removed, if the cryptographic value does not correspond to the second cryptographic value or if no cryptographic value can be extracted from the data stream. This may be beneficial to provide a user of the decoder and a viewer/listener of the data steam with information about the authenticity of the data stream.

According to another aspect, a data stream comprising a cryptographic value generated and inserted according to the methods outlined in the present patent document is described.

According to another aspect, an encoder operable to encode a data stream comprising a plurality of data frames is described. The encoder is operable to execute the method steps outlined in the present patent document. In particular, the encoder may comprise a processor operable to group a number N of successive data frames to form a first message; wherein N is greater than one; to group the first message with configuration information to form a second message; wherein the configuration information comprises information external to the data stream such as for rendering the data stream; to generate a cryptographic value of the second message; and to insert the cryptographic value into the data stream subsequent to the N successive data frames.

According to a further aspect, a decoder operable to verify a data stream comprising a plurality of data frames and a cryptographic value associated to a number N of preceding successive data frames, wherein N is greater than one, is described. The decoder is operable to execute the method steps outlined in the present patent document. In particular, the decoder may comprise a processor operable to extract the N successive data frames to form a first message; to group the first message with configuration information to form a second message; wherein the configuration information comprises information for rendering the data stream; to generate a second cryptographic value of the second message; to extract the cryptographic value from the data stream; and to compare the cryptographic value with the second cryptographic value.

According to a further aspect, a software program is described. The software program is adapted for execution on a processor and for performing the method steps outlined in the present patent document when carried out on a computing device.

According to a further aspect, a storage medium is described. The storage medium comprises a software program adapted for execution on a processor and for performing the method steps outlined in the present patent document when carried out on a computing device.

According to a further aspect, a computer program product is described. The computer program product comprises executable instructions for performing the method steps outlined in the present patent document when executed on a computer.

According to a further aspect, a set-top box, a portable electronic device (e.g. a mobile telephone, a PDA, a smartphone, etc.) or a computer (e.g. a desktop computer, a laptop, etc.) for decoding a received data stream is described. The data stream may comprise an audio signal. The set-top box preferably comprises a decoder according to the aspects outlined in the present patent document.

According to a further aspect, a broadcasting system for transmitting a data stream is described. The data stream may comprise an audio signal. The broadcasting system preferably comprises an encoder according to the aspects outlined in the present patent document.

According to another aspect, a method for concatenating a first and a second bitstream at a splicing point is described. Each of the two bitstreams may comprise a plurality of data frames and a cryptographic value associated with a given number of data frames. The first bitstream may comprise a cryptographic value for every N1 succeeding frames, whereas the second bitstream may comprise a cryptographic value for every N2 succeeding frames. The numbers N1 and N2 may be identical, i.e. the two bitstreams have the same cryptographic repetition period, or the numbers N1 and N2 may be different, i.e. the numbers of frames after which cryptographic values are included in the bitstreams are different.

The concatenation method comprises the step of generating a concatenated bitstream from the first and second bitstream, wherein the concatenated bitstream comprises at least a portion of the plurality of data frames from the first and second bitstream. In other words, the second bitstream or a portion of the second bitstream is attached at the splicing point to the first bitstream or a portion of the first bitstream.

The concatenated bitstream comprises cryptographic values generated and inserted according to the methods outlined in the present patent document. Advantageously, the cryptographic values in the concatenated bitstream smoothly cover the splicing point so that no interruption of bitstream authenticity is noticeable at a receiver/decoder. This may be achieved by explicitly generating new cryptographic values for the concatenated bitstream after the splicing point.

New cryptographic values may be generated at least for a certain number of succeeding frames in a section of the concatenated bitstream starting at the splicing point. In some cases, cryptographic values of the second bitstream may be reused and copied into the concatenated bitstream after the section where new cryptographic values have been included. This applies in particular when the cryptographic value of the previous group of frames, which is included in the first frame of the next group, is not considered for the calculation of the cryptographic value of the next group and the groups can be handled independently, i.e. changes in cryptographic values are not propagated from one group to the next.

The explicit generation of cryptographic values according to the methods outlined in the present patent document may be particularly beneficial at the boundaries between the first bitstream and the second bitstream, i.e. for final frames of the first bitstream and for first frames of the second bitstream that are included in the concatenated bitstream. In general when splicing two bitstreams, the number of final frames of the first bitstream is typically smaller or equal to N1, and/or the number of frames taken from the second bitstream before the first cryptographic value is included is typically smaller or equal to N2. In other words, the splicing point is typically not positioned at the group boundaries of the first and second bitstream.

According to an aspect of the concatenation or splicing method, a new cryptographic value is generated for the final frames of the first bitstream and inserted into the next frame of the concatenated bitstream, which is the first frame taken from the second bitstream. This new cryptographic value is considered to "complete" the first bitstream. New cryptographic values may then be generated for the second bitstream and included into the concatenated bitstream at the appropriate positions. This is particularly useful if, without the added cryptographic value inserted into the first frame taken from the second bitstream, the number of frames between the last cryptographic value generated for frames from the first bitstream and the first cryptographic value generated for frames from the second bitstream would exceed a maximum number allowed by the system.

In case the splicing point is not aligned with the groups of frames of the first and second bitstream, the splicing method may generate a cryptographic value for a mixed group comprising frames taken from the first and second bitstream. As already mentioned, the cryptographic values are typically included in the next frame following the group of frames used for calculating the respective cryptographic value.

According to a further aspect, a splicer and/or broadcasting headend is described. This splicer and/or broadcasting headend is operable to concatenate a first and a second bitstream, each comprising a plurality of data frames and cryptographic values associated with a given number of data frames. The device may comprise a decoder having any combination of features outlined in the present patent document. This decoder may be used for decoding final frames of the first bitstream, first frames of the second bitstream and the associated cryptographic values. The splicer and/or broadcasting headend may further comprise an encoder having any combination of features outlined in the present patent document. The encoder may be used for encoding the final frames of the first bitstream and the first frames of the second bitstream. In addition, the splicer and/or broadcasting headend may comprise a forwarding unit for forwarding frames and associated cryptographic values of the first and the second bitstream which are not decoded and encoded. In other words, the forwarding unit may simply copy or forward or carry over the frames and the associated cryptographic values onto the concatenated bitstream.

It should be noted that the splicer may also be operable to decode and encode complete data streams, i.e. to decode the cryptographic values of an incoming data stream and to generate cryptographic values for the outgoing data stream. This may be beneficial in order to generate a continuous interconnection of the bitstream through cryptographic values. As a matter of fact, a plurality of bitstreams may be decoded and a concatenated bitstream comprising parts of the plurality of bitstreams may be encoded with continuously interconnected cryptographic values. As such, a receiver of the concatenated bitstream would consider the concatenated bitstream as a bitstream originating from a single entrusted encoder.

It should also be noted that for the purpose of decoding and/or encoding of the bitstreams comprising cryptographic values, the splicer may not need to be aware of the underlying codec of the data stream. By way of example, the splicer does not need to be enabled to perform HE-AAC decoding/encoding, in order to extract and/or generate the cryptographic values of the data streams. In some situations, e.g. when a new cryptographic value is inserted into a frame which previously had no cryptographic value, decoding and subsequent re-encoding of the data stream may be necessary to create space in the bitstream for the new cryptographic value, in particular to meet bitstream requirements.

It should be noted that the methods and systems including the preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner. In addition, it should be noted that the order of the method steps may be varied.

DESCRIPTION OF THE FIGURES

The invention is explained below in an exemplary manner with reference to the accompanying drawings, wherein

FIGS. 6 and 7 illustrate examples of splicing bitstreams to form a concatenated bitstream.

The following embodiments are described by way of example and should not restrict the scope of the present patent document. The invention will be described in the context of AAC (Advanced Audio Coding) and in particular MPEG-2 AAC and MPEG-4 AAC. It should be noted, however, that the invention may also be applied to other media coding schemes, notably audio, video and/or multimedia coding schemes. Furthermore, it may be applied in a splicer providing a combined bitstream from a plurality of encoders.

Figure 1:
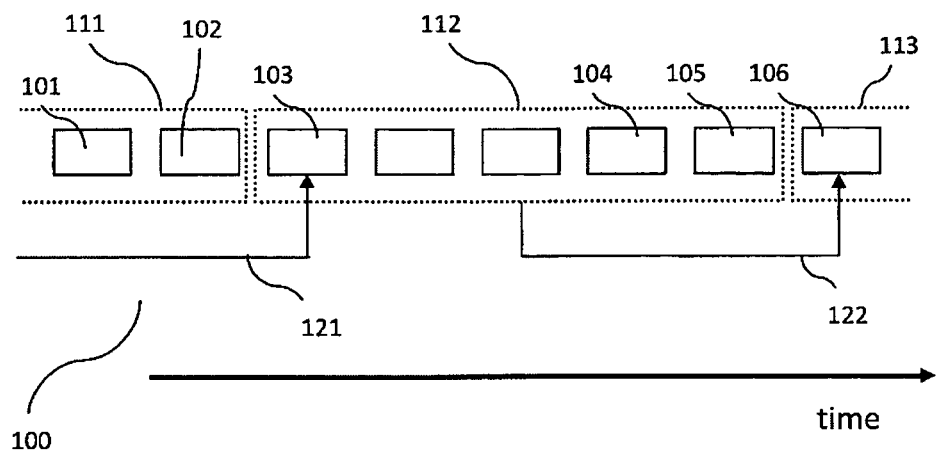
FIG. 1 illustrates an exemplary method for determining an identifier according to the invention.

FIG. 1 illustrates a bitstream 100 and a method how an identifier is determined for this bitstream 100. Examples for such bitstreams are encoded video and/or audio bitstreams with AAC, HE-AAC (High Efficiency—Advanced Audio Coding), Dolby Pulse, MPEG-4 AVC/H.264, MPEG-2 Video or MPEG-4 Video as underlying codec. Such codecs and their format are defined e.g. in the ISO/IEC 14496-3 specification for MPEG-4 AAC, in the ISO/IEC 13818-7 specification for MPEG-2 AAC, in the ISO/IEC 14496-10 specification for MPEG-4 AVC/H.264, in the ISO/IEC 13818-2 specification for MPEG-2 Video and in the ISO/IEC 14496-2 specification for MPEG-4 Video. These specifications are incorporated by reference. In these codecs the data streams are arranged in so called frames, wherein the frames comprise a certain number of media samples. Different codecs may use a different number of samples per frame. Typical examples are 960, 1024 or 2048 samples per frame.

In addition to the actual media data, the frames may further comprise so called metadata which may carry additional control information e.g. on program loudness or dynamic range.

FIG. 1 shows a succession of frames 101, 102, 103 up to 106. The time axis goes from left to right, such that frame 101 is processed before frame 106. As outlined above, each frame may comprise media data and additional metadata. The structure of each frame and the possible data fields or elements that it may comprise are defined by the underlying encoding scheme. By way of example, a MPEG-4 AAC frame or an MPEG-2 AAC frame may comprise audio data for a time period of 1024 or 960 samples, related information and other data. Its syntax and structure are defined in Sections 4.4 and 4.5 of the above mentioned ISO/IEC 14496-3 specification for MPEG-4 AAC and in Sections 6 and 8 of the above mentioned ISO/IEC 13818-7 specification for MPEG-2 AAC. These Sections are incorporated by reference.

An MPEG-4 AAC or MPEG-2 AAC frame may comprise different syntactic elements, such as
- a single_channel_element( ) abbreviated as SCE, which is the syntactic element of the bitstream containing coded data for a single audio channel.
- a channel_pair_element( ), abbreviated as CPE, which is the syntactic element of the bitstream payload containing data for a pair of channels.
- a coupling_channel_element( ), abbreviated as CCE which is the syntactic element that contains audio data for a coupling channel.
- a lfe_channel_element( ), abbreviated as LFE, which is the syntactic element that contains a low sampling frequency enhancement channel.
- a program_config_element( ), abbreviated as PCE, which is the syntactic element that contains program configuration data.
- a fill_element( ), abbreviated as FIL, which is the syntactic element that contains fill data.
- a data_stream_element( ), abbreviated as DSE, which is the syntactic element that contains auxiliary data.
- a TERM syntactic element indicating the end of a raw data block or frame.

These syntactic elements are used within a frame or raw data block, in order to specify the media data and related control data. By way of example, two frames of a mono audio signal may be specified through the syntactic elements <SCE><TERM><SCE><TERM>. Two frames of a stereo audio signal may be specified by the syntactic elements <CPE><TERM><CPE><TERM>. Two frames of a 5.1 channel audio signal may be specified by the syntactic elements <SCE><CPE><CPE><LFE><TERM><SCE><CPE><CPE><LFE><TERM>.

The proposed method groups a certain number N of such frames and thereby forms groups of frames 111, 112 and 113. FIG. 1 shows a complete group of frames 112 comprising N=5 frames 103 through 105. The five frames of group of frames 112 are concatenated in order to form a first message.

Using a cryptographic hash function H(.) and a "secret" key K which is typically padded to the right with extra zeros to the block size of the hash function H(.), a hash message authentication code (HMAC) of the first message may be determined. Let the || sign denote a concatenation and the ⊕ sign denote an exclusive or, and the outer padding opad=0x5c5c5c . . . 5c5c and the inner padding ipad=0xx363636 . . . 3636 be constants of the length of the block size of the hash function H(.), then the HMAC value of the first message may be written as $$HMAC(m)=H((K\oplus opad)\|H((K\oplus ipad)\|m)),$$

where m is a message, also referred to here as the first message. The block size used with MD5 or SHA-1 hash functions is typically 512 bits. The size of the output of the HMAC operation is the same as that of the underlying hash function, i.e. 128 bits in case of MD5 or 160 bits in case of SHA-1.

The HMAC value of the first message, i.e. the HMAC value of the concatenated frames 103 through 105 of the group of frames 112, may be used as the identifier of the group of frames 112. In order to reduce the length of the identifier, the HMAC value may be truncated, e.g. truncated to 16, 24, 32, 48 or 64 bits. It should be noted, however, that such truncating operation typically affects the security of the hash message authentication code. As the identifier is inserted into the data stream, the proposed method preferably uses a truncated version of the HMAC value as the identifier.

As shown in FIG. 1, the identifier 122 of the group of frames 112 is inserted into a frame of the following group of frames 113. Preferably, the identifier 122 is inserted into the first frame 106 of the succeeding group of frames 113. In a similar manner, an identifier 121 had been determined for the preceding group of frames 111 and inserted in the first frame 103 of the group of frames 112.

It should be noted that the identifier 122 of the group of frames 112 may be calculated based on a first message m which comprises the identifier 121 of the previous group of frames 111 or it may be calculated based on a first message m which does not comprise the identifier 121 of the previous group of frames 111. In the latter case, the information regarding the identifier 121 would need to be removed from the first message m prior to determining the identifier 122. It would need to be ensured that the encoder and the decoder apply the same method for defining the first message m. In a preferred embodiment, the identifier 122 is determined based on a first message m which comprises the identifier 121 of the previous group of frames 111. By doing this, the identifiers can be continuously interconnected and thereby an interconnected bitstream may be created which cannot be modified, e.g. by modifying or replacing certain groups of frames of the bitstream. By consequence, the authenticity of the complete data stream or bitstream can be ensured. On the other hand, it is still ensured that a receiver may resynchronize on a partially corrupted bitstream, even though the identifiers are interconnected.

In a preferred embodiment, the identifier is placed into a single data_stream_element( ), abbreviated as <DSE>, and defined in ISO/IEC 14496-3, Table 4.10 for MPEG-4 AAC or defined in ISO/IEC 13818-7, Table 24 for MPEG-2 AAC which are incorporated by reference. In order to facilitate a synchronization of the decoder, an AAC frame should only comprise one data_stream_element( ) <DSE> holding an identifier, so that the decoder may determine the length of a group of frames as the distance between two received identifiers. In other words, an AAC frame may comprise several data_stream_element( ) <DSE>, but should comprise only one data_stream_element( ) <DSE> which comprises an identifier. In a preferred embodiment, the location of the <DSE> is at the end of the AAC frame right before the <TERM> element.

In order to allow for a rapid extraction of the identifier, the byte-alignment feature of the DSE may be used. For this purpose the DSE typically comprises a field or a bit which indicates that the data comprised in the DSE is byte-aligned. This indicates to a decoder that the actual data of the DSE starts at a bit position at the beginning of a byte.

A bitstream or data stream may comprise multiple <DSE>. In order to be able to distinguish one <DSE> from another, each <DSE> typically includes an element_instance_tag as defined for MPEG-4 AAC in ISO/IEC 14496-3, Section 4.5.2.1.1, and for MPEG-2 AAC in ISO/IEC 13818-7, Section 8.2.2, both of which are incorporated by reference. It should be noted that the value of the element_instance_tag of the data_stream_element( ) comprising the identifier is not restricted to a specific value, i.e. the general rules of the ISO/IEC standards apply. In other words, there are preferably no special rules for the element instance tag for a <DSE> containing a transmitted identifier beyond those set out for MPEG-4 AAC in the ISO/IEC 14496-3 document and for MPEG-2 AAC in the ISO/IEC 13818-7 document.

In analogy to the examples of possible streams shown above, a data stream for a 2-channel audio program could comprise the syntactic elements <CPE><FIL><DSE><TERM><CPE><FIL><DSE><TERM> . . . . A 2-channel audio program with SBR (Spectral Band Replication) could comprise the syntactic elements <CPE><SBR(CPE)><FIL><DSE><TERM><CPE><SBR(CPE)><FIL><DSE><TERM> . . . , wherein <SBR(CPE)> is a syntactic element specific to SBR. A 5.1-channel audio program could be made up of the syntactic elements <SCE><CPE><CPE><LFE><FIL><DSE><TERM><SCE><CPE><CPE><LFE><FIL><DSE><TERM> . . . .

In a preferred embodiment, the identifier field placed into the <DSE> element could comprise an identifier_sync field and an identifier_value field. The identifier_sync field may be used to allow for a rapid identification, based on the fact that the particular <DSE> element comprises an identifier. By way of example, the encoder may set this field to a predefined value, e.g. a binary pattern, in order to indicate that the <DSE> element comprises an identifier field. The decoder may use this field to verify the availability of the identifier value. In other words, the decoder is informed that the received data stream comprises an identifier which may be used for the above mentioned authentication, verification and possibly configuration purposes.

In a preferred embodiment, the identifier_value field comprises the identifier value which has been determined as outlined in the present document. The field comprises the required number of bits for the identifier, i.e. for the truncated version of the HMAC value. As outlined above, the identifier typically covers N, wherein N≥1, AAC frames and every $N^{th}$ AAC frame comprises an identifier, i.e. it comprises a <DSE> element which comprises an identifier element as described above. Typically, it is the encoder that decides on the number N of covered AAC frames. The decoder is able to determine this value by the distance in frames between two AAC frames comprising corresponding identifiers.

As outlined above, the identifier may also be used to ensure that the decoder uses the correct configuration settings. For this purpose, the identifier may be generated based on an extended message which does not only comprise the concatenation of N succeeding frames, but which also comprises configuration data. In other words, the first message which comprises N succeeding frames as outlined above may further comprise configuration data. Such configuration data may comprise a samplingFrequencyIndex, i.e. an indication of the underlying sampling frequency of the audio signal, a channelConfiguration, i.e. an indication of the channel configuration used, and a frameLengthFlag, i.e. an indication of the used frame length. Also other configuration parameters are possible as well.

These parameters, i.e. the AAC (core) sampling rate or "samplingFrequencyIndex", the channel configuration and the AAC transform length indication or "frameLengthFlag" may be used to form a configuration_word. This configuration_word may also comprise padding bits, in order to bring it to a predetermined size.

In a preferred embodiment, the parameters "samplingFrequencyIndex" and "channelConfiguration" have the same meaning and value as the elements of the same name in the "AudioSpecificConfig" outlined in the respective ISO/IEC specification (e.g. section 1.6.2.1 of ISO/IEC 14496-3). The parameter "frameLengthFlag" has the same meaning and value as the element of the same name in the "GASpecificConfig" outlined in the respective ISO/IEC specification (e.g. section 4.4.1, Table 4.1 of ISO/IEC 14496-3).

The configuration_word and the N AAC frames are concatenated to form a message m, which may also be referred to as the second message, which comprises the configuration_word in addition to the first message, which comprises the concatenation of N AAC frames:

$$m=(\text{configuration\_word}\|\text{AACframe1}\|\text{AACframe2}\| \ldots \|\text{AACframe}N);$$

wherein ∥ denotes concatenation. In the example shown above, the configuration_word is placed in front of the first message. It should be noted that the configuration_word may also be placed at other positions, e.g. at the end of the first message.

In an analogous manner as outlined above, a HMAC value, e.g. a HMAC-MD5 code, HMAC(m) over the message m is calculated using the "secret" key K. The key K may e.g. be a given ASCII code or any other secret value, and the HMAC value of the message m is calculated using the above mentioned HMAC formula.

It should be noted that the HMAC value of the message m may be determined in a sequential manner. This means that in a first step, the HMAC value of the configuration_word may be determined. This yields a first HMAC value as a starting state for the determination of the HMAC value of AACframe1. The output of this operation is a second HMAC value which is the starting state for the determination of the HMAC value of AACframe2, and so on. Eventually, the HMAC value of AACframeN is determined using the HMAC value of AACframeN−1 as a starting state. By using such a sequential determination of the HMAC value across the message m, i.e. across the sequence of frames and/or the configuration_word, it is possible to generate an identifier without increasing the delay incurred by the bitstream. Furthermore, the memory requirements for generating an HMAC value and/or identifier are kept low, as only the current frame of the bitstream and the starting state, i.e. a 128 bits value, need to be stored. A generation and storage of the complete message m is not required.

In order to reduce the overhead in the bitstream caused by the additional identifier, the HMAC value is truncated from 128 bits to a reduced number of bits by throwing away the least significant bits. By way of example, the HMAC value "9e107d9d372bb6826bd81d3542a419d6" could be truncated to "9e107d9d". The degree of truncating is preferably selected as a compromise between security of the identifier and the required bit-rate overhead. Possible lengths of the identifier may e.g. be 16, 24, 32, 48, 64, 80 or 96. The truncated HMAC value is the identifier which is inserted in the identifier_value field of the DSE element.

In the following, further details with regards to the encoding process are provided. As already mentioned, it is typically the encoder which decides on the number N of AAC frames that are covered by one identifier. As an example, it may be desirable to ensure that a decoder be able to synchronize with the length of the group of frames in no more than 1 second.

Because two identifiers are required in order for the decoder to synchronize with the length of the group of frames, which is given by the number of frames between two frames comprising an identifier, it must be ensured that the decoder receives at least two identifiers within the desired time interval. Therefore, the encoder should choose a value N such that the time representation of the N AAC frames does not exceed, or only minimally exceeds 0.5 seconds. Since the time representation of the N AAC frames is dependent on the selected AAC (core) sample rate, the value N chosen by the encoder may vary depending on the selected AAC (core) sample rate.

In order to minimize the bit rate overhead introduced by the identifier, the encoder may choose the largest value of N that satisfies the constraint that the time representation of the N AAC frames does not exceed 0.5 seconds. In some applications, it may be acceptable for the time representation of the N AAC frames to slightly exceed 0.5 seconds. In these applications, the encoder may choose the value of N such that the time representation of the N AAC frames is as close to 0.5 seconds as possible, even though this may in some cases result in the time representation of the N AAC frames slightly exceeding 0.5 seconds. The overhead that is introduced by the transmission of the identifier can be determined by evaluating the ratio between the length of the DSE comprising the identifier and the overall length of the group of frames (in number of bits).

Furthermore, it is advisable to align the insertion of an identifier with the insertion of other configuration elements like the SBR header. This allows a decoder to easily synchronize to a bitstream and it allows the receipt of all configuration words during a single-frame decode.

It should be noted that the first produced AAC frame may contain a dummy identifier. The purpose of the first identifier would be to signal to the decoder the start of an AAC frame sequence comprising identifiers. The decoder would not, however, be in a position to perform authentication and verification, as the identifier would not be based on actual media data.

As outlined in relation to FIG. 1, the first calculated identifier covers the AAC frames 1 to N and is stored in AAC frame N+1. The next identifier covers the AAC frames N+1 to 2N and is stored in AAC frame 2N+1, and so on.

Figure 2A:
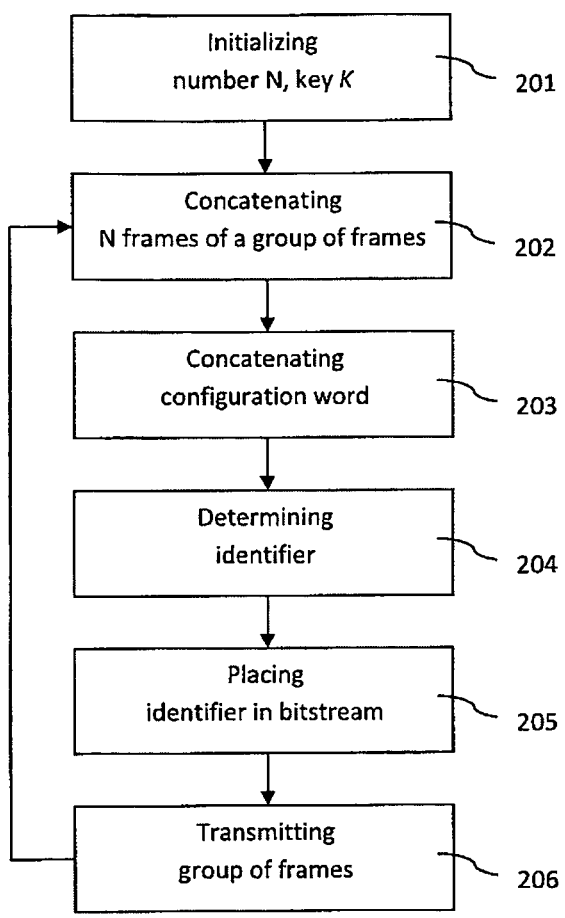
FIGS. 2a and 2b show flow charts of an exemplary method for identifier generation and insertion at the encoder.

FIG. 2*a* illustrates a flow chart of the encoding process. In step 201 the encoder is initialized by providing a number N of frames comprised in a group of frames. Furthermore, the key K is provided. In the following step 202, the N frames in a group of frames are concatenated in order to provide the first message. Then, in step 203, the first message is concatenated with the configuration word, in order to yield the second message. In step 204, the identifier is determined as the truncated version of the HMAC value calculated over the second message. This identifier is placed in the first frame of the succeeding group of frames (step 205). Finally, the group of frames is transmitted in step 206. It should be noted that the transmitted group of frames contains the identifier of the previously transmitted group of frames. The steps 202 to 206 are repeated until the complete data stream is transmitted.

Figure 2B:
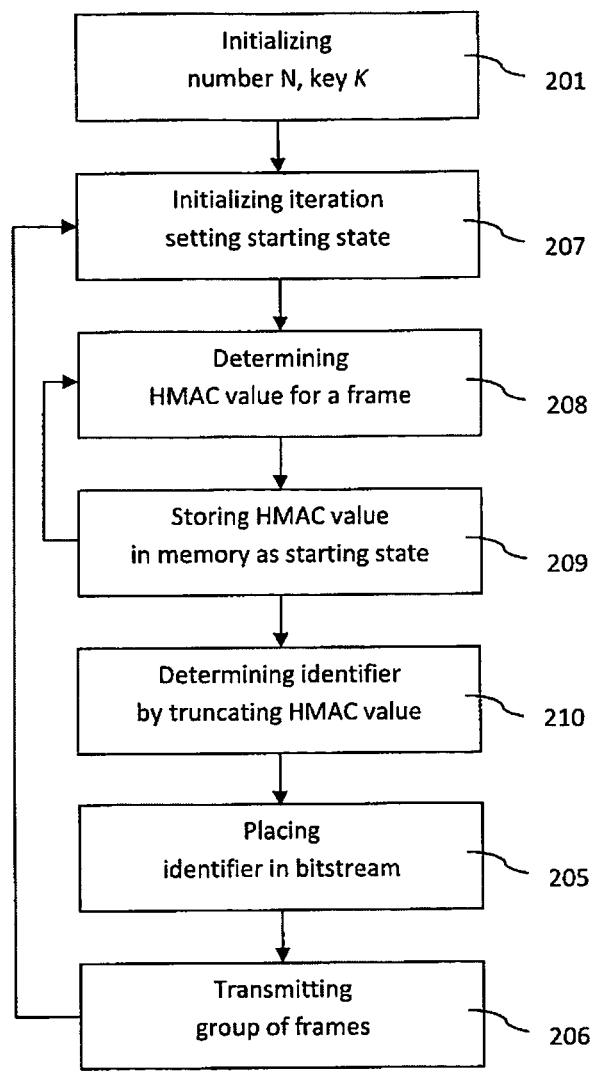

As already mentioned, the above process can be performed in a sequential iterative manner. This means that the identifier may be determined frame by frame, without the need to first concatenate N frames and the configuration_word and to perform the HMAC calculation on such complete concatenated message. This is illustrated in FIG. 2*b*. The iterative procedure is initialized in step 207 by setting a starting state. The starting state may be the HMAC value of the configuration_word, which is stored in a 128 bit memory. Then an HMAC value may be determined for the first of the N frames (step 208). The resulting HMAC value is stored in the 128 bit memory (step 209) and used as a starting state for the calculating of the HMAC value of the second frame (step 208). This process is repeated until the HMAC value of the N$^{th}$ frame is determined, wherein the HMAC value of the N−1$^{th}$ frame is taken from the 128 bit memory and used as a starting state (step 208). The identifier is determined as the truncated version of the HMAC value of the N$^{th}$ frame (step 210). As alternative to step 206, each frame may be sent out immediately after being processed for the HMAC value calculation without buffering the entire group of frames. The identifier is then added to the N+1$^{th}$ frame and sent out with that frame. That frame is then the first frame to be used in the iterative calculation of the HMAC value for the next N frames. By using such iterative process, the encoding process can be performed frame by frame at low delay, low computational complexity and low memory requirements.

In the following, further details are provided with regards to the decoding process. Typically, the decoder starts with the assumption that the stream to be decoded does not comprise a valid identifier. I.e. an indicator for the presence of a valid identifier in the media bitstream will initially be set to a "false" value and typically only be set to a "true" value upon the first successful reception of a valid identifier. This may be indicated at the receiver, e.g. a set-top box, by a visual indicator such as an LED that indicates to a user that the received bitstream is an authenticated and valid bitstream. By consequence, the identifier could be used to indicate the quality of a received data stream to a user.

On the other hand, if the indicator at the decoder was set to "true", but for more than Nmax frames there is no update regarding the identifier within the bit stream, the indicator may be reset to "false". In other words, the decoder may be aware of a maximum value for N, e.g. Nmax, that should not be exceeded. If the decoder does not detect a valid identifier for more than Nmax frames, then this indicates to the decoder that the received bitstream may not originate from a legitimate encoder anymore, or that the received bitstream may have been altered. By consequence, the decoder sets the respective indicator to "false". This would typically result in the visual indicator, e.g. the LED, to be reset.

Figure 3:
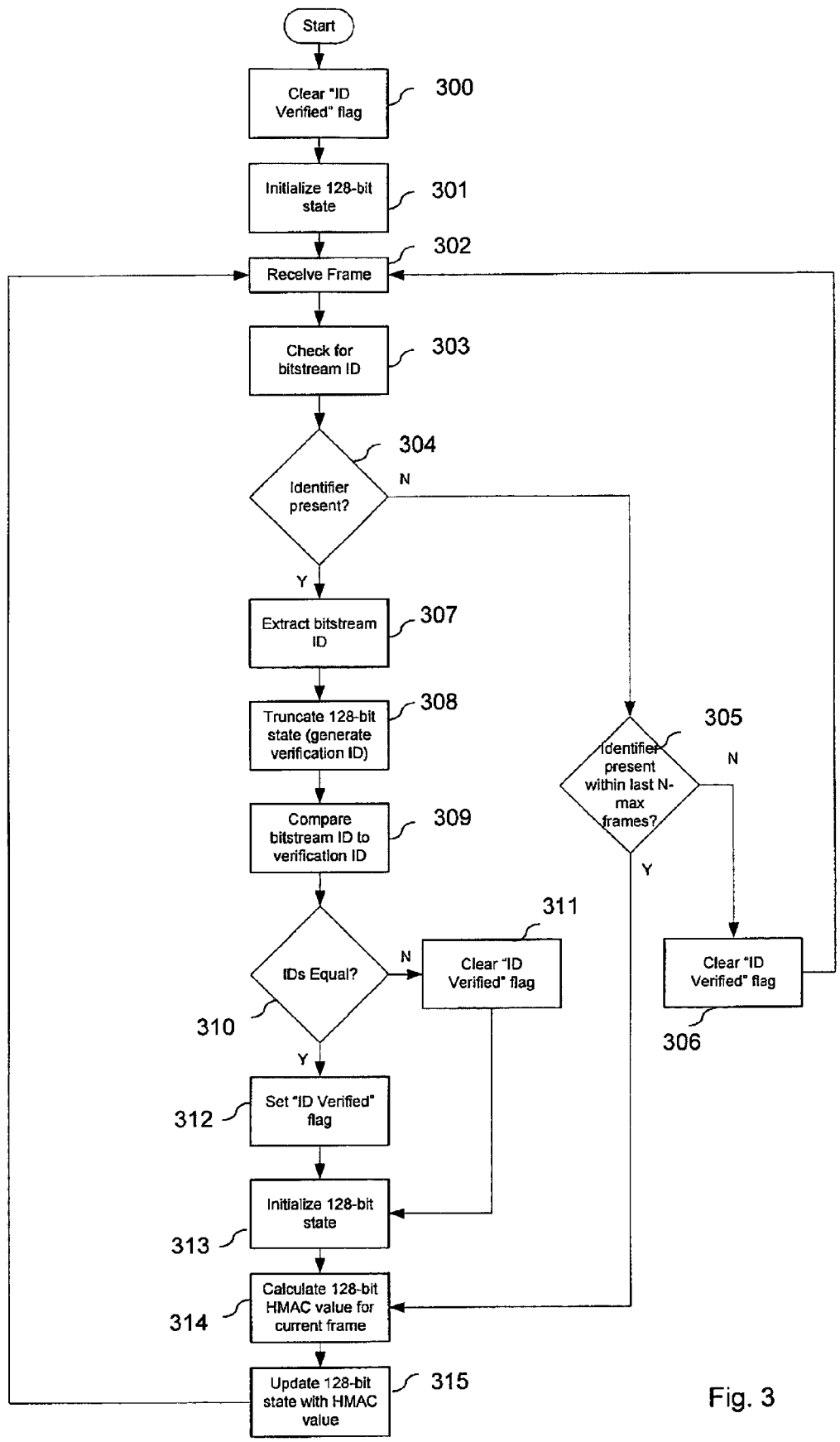
FIG. 3 shows a flow chart of exemplary authentication and verification steps taken at the decoder.

The identifier decoding procedure is illustrated in FIG. 3 and may be described as follows:

- The decoder starts and clears the "ID Verified" flag in step 300.
- Next, the internal memory state (128-bit) is initialized in step 301.
- The decoder waits until a frame is received (step 302) and checks the received frame for presence of a bitstream identifier in step 303. The presence of an identifier within a frame may be detected by means of the identifier_sync field specified above. The decoder extracts the identifier_value from the respective field in the <DSE> in step 307 if an identifier was detected in step 304.
- Next, the verification identifier is generated by truncating the HMAC value contained in the 128-bit state in step 308.
- The decoder continues by comparing the bitstream identifier and the verification identifier in step 309. If it is determined that both IDs are not equal (step 310), the "ID Verified" flag is cleared in step 311 to indicate that the bitstream is not originating from an entrusted encoder. In case of identical IDs, the "ID Verified" flag is set in step 312 to indicate that the bitstream identifier is verified and the bitstream is considered valid because it comes from an entrusted encoder. In this case additional features of the decoder may be enabled and/or the user informed of the verification status of the bitstream. Alternatively, some features may be disabled if the bitstream is determined to not originate from an entrusted encoder and/or the user informed accordingly.

The decoding process continues in step 313 by initializing the 128-bit internal memory state.

Next, the 128-bit HMAC value for the current frame is calculated in step 314 and the 128-bit internal memory state is updated with the calculated HMAC value in step 315. The decoder then returns to step 302 to wait for reception of another frame.

If no identifier is present in the frame (as determined in step 304), the decoder proceeds to step 305 where the decoder determines whether an identifier was present within the last Nmax frames.

In case that no identifier was present within the last Nmax frames, the decoder clears the "ID verified" flag in step 306 because the maximum number of frames Nmax has passed without an identifier being received. The decoder then returns to step 302 to wait for another frame.

If an identifier was present within the last Nmax frames, as determined in step 305, the decoder proceeds to step 314 to calculate the 128-bit HMAC value for the current frame.

As outlined above, the decoder can determine the verification identifier in a sequential iterative process. This means that only the current frame is processed and it is not required to first concatenate a set of frames for the determination of the verification identifier. By consequence, the decoding of the identifier can be performed at low delay, low computational complexity and low memory requirements.

Figure 4:
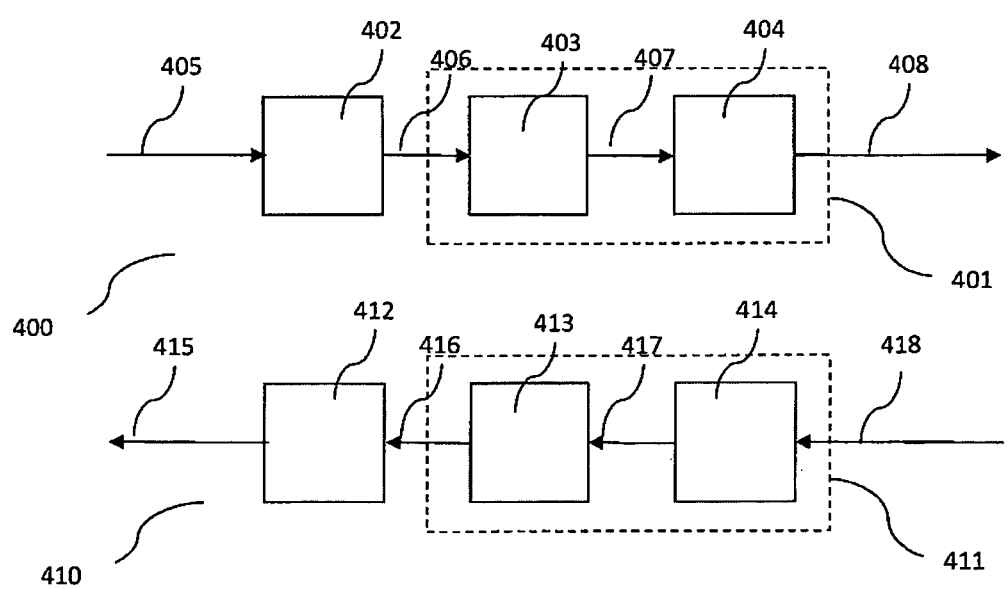
FIG. 4 illustrates an exemplary embodiment of an encoder and a decoder.

FIG. 4 illustrates an exemplary embodiment of an encoder 400 and a decoder 410 of a data stream. An analog data stream 405, e.g. an audio stream, is converted into a digital data stream 406 using an analog-to-digital converter 402. The digital data stream 406 is encoded using an audio encoder 403, e.g. Dolby E, Dolby Digital, AAC, HE AAC, DTS or Dolby Pulse. The audio encoder 403 typically segments the digital data stream 406 into audio frames and provides data compression. Furthermore, the audio encoder 403 may add metadata. The output of the audio encoder 403 is a data stream 407 comprising a plurality of data frames. Subsequently, the data stream 407 enters an additional frame encoder 404 which adds identifiers or cryptographic values to the data stream 407. The frame encoder 404 performs according to the aspects outlined in the present patent document.

It should be noted that typically the identifiers are determined and added in a sequential manner, such that each frame coming from the audio encoder 403 is directly processed by the frame encoder 404. Preferably, the audio encoder 403 and the frame encoder 404 form a joint encoder 401 which may be implemented on a digital signal processor. This way, audio encoding aspects and identifier generation aspects can interact. In particular, it may be required to take into account the additional overhead caused by the identifier during the encoding of the audio stream. This means that the available bit-rate for the audio bitstream may be reduced. Such interaction between the audio coder and the identifier generation may be used to meet an overall bandwidth and/or bit-rate limitation of certain encoding schemes, e.g. HE-AAC.

The joint encoder 401 outputs a data stream 408 comprising a plurality of groups of frames and associated identifiers. The data stream 408 is typically provided to an associated decoder and/or receiver 410 using various transmission media and/or storage media. It reaches the decoder 410 as a data stream 418 which may have been altered with regards to the data stream 408. The data stream 418 enters a frame decoder 414 which performs a verification and authentication of the data stream 418 according to the methods and systems outlined in the present patent document. The frame decoder 414 outputs a data stream 417 which typically corresponds to the data stream 418 without the identifiers and the corresponding data field or syntactic elements. The data stream 417 is decoded in the audio decoder 413, where it is decompressed and where the added metadata is removed. As outlined above, the frame decoding is typically performed in a sequential iterative manner, such that the processing is performed frame-by-frame.

It should also be noted that the different decoding/receiving components may be grouped together, in order to form a joint decoder. By way of example, the frame decoder 414 and the audio decoder 413 may form a joint decoder/receiver 411 which may be implemented on a digital signal processor. As outlined above, this may be beneficial, in order to allow for interaction between the audio decoder and the verification of the identifier. Eventually, the joint decoder/receiver 411 outputs a digital data stream 416 which is converted into an analog audio signal 415 using a digital-to-analog converter 412.

It should be noted that in the present document, the term "encoder", may refer to the complete encoder 400, the joint encoder 401 or the frame encoder 404. The term "decoder" may refer to the complete decoder 410, the joint decoder 411 or the frame decoder 414. On the other hand, so called "untrusted encoders" are encoders, which do not generate an identifier at all, or which do not generate an identifier according to the methods outlined in the present document.

Figure 5:
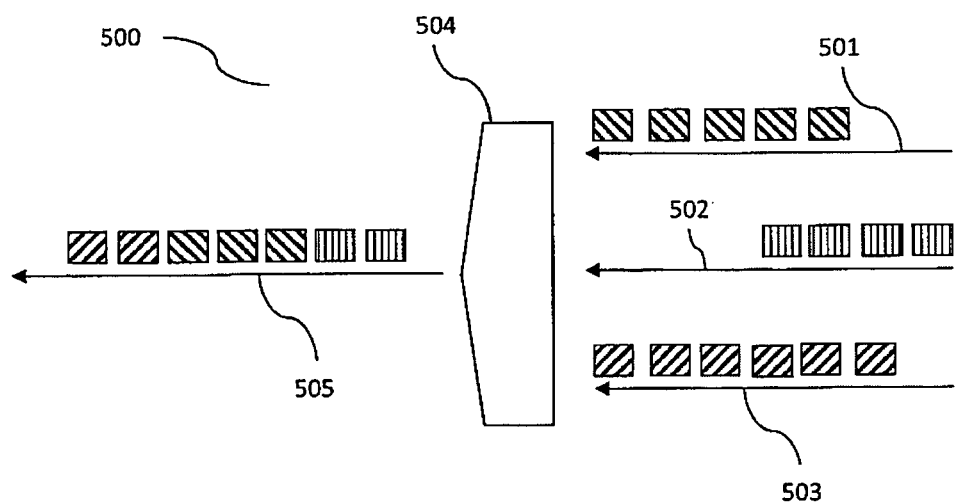
FIG. 5 illustrates an example for the use of an identifier within a broadcasting system.

FIG. 5 illustrates an exemplary broadcasting system 500 which comprises a broadcasting headend 504. The headend 504 also comprises a splicer or splicing means, which is operable to combine bitstreams 501, 502 and 503 originating from different encoders. Within a radio broadcasting system, such different bitstreams 501, 502 and 503 may be different audio bitstreams which are typically encoded by different audio encoders. The bitstreams 501, 502 and 503 are composed of a plurality of frames, which are represented by the differently shaded blocks. In the illustrated example, bitstream 501 comprises five frames, bitstream 502 comprises four frames and bitstream 503 comprises six frames. The splicer and/or headend 504 is operable to combine the bitstream, in order to generate a joint bitstream 505. As shown in the example, this may be done by attaching bitstream 501 to bitstream 503, and by attaching bitstream 502 to bitstream 501. However, as is also shown in FIG. 5 it may be required to only select portions of the original bitstreams 501, 502 and 503, e.g. only portions of the audio bitstreams. As such, the combined bitstream 505 comprises only two frames of bitstream 503, followed by three frames of bitstream 501 and followed by two frames of bitstream 502.

The original bitstreams 501, 502 and 503 may comprise identifiers, i.e. the bitstreams 501, 502 and 503 may originate from trusted encoders. Each of the identifiers may be based on a different number N of frames. Without lack of generality, it is assumed that the identifiers of bitstreams 501 and 503 have been determined for a group of frames comprising two frames. On the other hand, bitstream 502 does not originate from a trusted encoder and therefore does not comprise an identifier.

It is desirable that the splicer and/or the headend 504 broadcast a bitstream 505 which also comprises an identifier, if the incoming bitstreams 501 and 503 originate from a trusted encoder. Such an identifier should be sent within the bitstream 505 for all the portions of the bitstream 505 which originate from a trusted encoder. On the other hand, the portions of the bitstream 505 which do not originate from a trusted encoder, i.e. the portions taken from bitstream 502, should not comprise an identifier.

In order to achieve this goal, the splicer and/or headend 504 may be operable to perform a decoding and/or an encoding of the identifier. As shown in FIG. 5 the first two frames of the outgoing bitstream 505 originate from bitstream 503. If these two frames correspond to a group of frames then the identifier of this group of frames may be placed in the third frame of bitstream 505. This is outlined in relation to FIG. 1. If, on the other hand, the two frames belong to different group of frames, then the headend 504 may be operable to verify, if bitstream 503 originates from a trusted encoder; and generate a new identifier for the outgoing frames of bitstream 503, i.e. for the first two frames of bitstream 505.

The number N used for generating an identifier on the outgoing bitstream 505 does not necessarily have to be the same number as the number N used for generating an identifier on the incoming bitstreams 501 and 503. This can be seen in the context of bitstream 501, for which only three frames are included in the outgoing bitstream 505. A first identifier may be generated for the first two frames, whereas a second identifier may be generated for the third frame. In other words, N may be two for the first two frames and N may be one for the third frame. In general, it may therefore be stated that N may be changed within a bitstream 505. This is due to the fact that N can be determined independently at the decoder. Preferably, the number N used for the outgoing bitstream 505 is smaller or equal to the number N used for the incoming bitstreams 501 and 503.

Furthermore, it should be noted that the incoming bitstream 502 does not comprise an identifier, i.e. bitstream 502 does not originate from a trusted encoder. By consequence, the splicer and/or headend 504 does not provide an identifier in bitstream 505 for the frames originating from bitstream 502. As already outlined above, the decoder is typically operable to detect the absence of an identifier in the bitstream 505. If the number of frames not comprising an identifier exceeds a predefined maximum number Nmax, then the decoder will typically detect that a bitstream 505 is not from a trusted encoder anymore.

As shown by the example of FIG. 5, bitstream 505 may be made up of portions which originate from a trusted encoder and other portions which do not originate from a trusted encoder. By consequence, a bitstream 505 may comprise portions which include a valid identifier and other portions which do not include a valid identifier. A splicer and/or headend 504 may be operable to detect incoming bitstreams comprising an identifier;

forward a bitstream comprising an identifier as an outgoing bitstream;

authenticate the incoming bitstream based on the identifier; and encode the bitstream with a new identifier.

In other words, a splicer and/or headend 504 may comprise the features of an encoder and/or a decoder outlined in the present patent document. I.e. a splicer and/or headend 504 may work as a decoder when receiving an incoming bitstream, and it may work as an encoder, when generating an outgoing bitstream. Furthermore, it may be operable to forward a bitstream comprising an identifier without performing authentication and re-encoding. This forwarding operation may be performed for continuous transmission of the same bitstream, whereas the decoding and re-encoding may preferably be used at the borders between bitstreams from different encoders. By using the forwarding operation, the computational load of the splicer and/or headend 504 may be reduced.

It should be noted that the forwarding operation may be used in cases where the identifier of a preceding group of frames is not influencing the identifier value of a current group of frames. In such cases, the group of frames and their associated identifier may be viewed as being an independent entity which may be directly forwarded to the outgoing bitstream. On the other hand, if continuous interconnected identifiers are used, where an identifier of a current group of frames depends on the identifier of the previous group of frames, then the splicer would preferably re-encode the entire bitstream, in order to generate a stream of continuously interconnected identifiers for the outgoing bitstream. This would ensure that an unauthorized party would not be able to replace segments of the outgoing bitstream.

It should be noted that in most instances the re-encoding of the splicer is only limited to the generation of new identifiers. The bitstream itself, i.e. notably the audio encoding, is typically not affected. Consequently, the re-encoding of the bitstream can be performed at low computational complexity. However, if a cryptographic value is inserted in a frame which previously contained no cryptographic value, then it may be necessary to perform audio re-encoding.

FIG. 6 further illustrates the splicing of incoming bitstreams 1 to 4 into an outgoing concatenated bitstream for a preferred embodiment. In the illustrated example, incoming bitstream 1 forms groups of 4 frames for generation of cryptographic values. The angled arrows under the bitstream illustrate that the cryptographic value of a group of frames is inserted into the first frame of the next group. The frames where the cryptographic values are inserted are hatched in the figure. The groups of frames of incoming bitstream 2 comprise 6 frames, and the groups of frames of incoming bitstream 3 comprise 5 frames. Incoming bitstream 4 has no cryptographic values and is not verified and entrusted.

The vertical lines in the figure indicate the splicing points. As one can see from the figure, the outgoing bitstream comprises a first section I corresponding to incoming bitstream 1, a second section II corresponding to incoming bitstream 2, a third section III corresponding to incoming bitstream 3, and a fourth section IV corresponding to incoming bitstream 4, the sections being spliced at the splicing points. Until the first splicing point, incoming bitstream 1 including cryptographic values can be copied into the concatenated bitstream. The first cryptographic value in section II, however, needs to be recalculated because, due to the splicing, it relates to different data frames than the corresponding cryptographic value of bitstream 2. In detail, this cryptographic value is generated based upon 5 frames, one belonging to incoming bitstream 1 (before the splicing point) and four belonging to incoming bitstream 2 (after the splicing point). The recalculation of cryptographic values is indicated by the arrows above the bitstream and the changed hatching. Because of the propagation of the change in the first recalculated cryptographic value in the concatenated bitstream, the following cryptographic values of bitstream 2 need to be recalculated, too.

At the second splicing point, the selected bitstream changes from 2 to 3. The cryptographic value of the first frame of bitstream III is recalculated based on the previous 6 frames of bitstream 2. At the next splicing point, untrusted bitstream 4 is selected and no cryptographic values are inserted into section IV of the concatenated bitstream. Alternatively, a cryptographic value may be generated for the final frames of bitstream 3 copied into the concatenated bitstream in order to correctly indicate when the entrusted section of the concatenated bitstream ends. This additional cryptographic value is preferably inserted into the first frame of section IV as indicated in the figure with a dashed circle. Depending on bit-rate requirements, it may be necessary to re-encode this frame to create space for inserting the additional cryptographic value.

FIG. 7 illustrates another example of concatenating incoming bitstreams 1 and 2 into an outgoing bitstream. Here, the splicing point is just before a frame carrying a cryptographic value in the first bitstream and just after a frame carrying a cryptographic value in the second bitstream. If one would take the positions of cryptographic values from the first and second bitstream, a large gap of cryptographic values would result in the concatenated bitstream. The distance between cryptographic values in this section of the concatenated bitstream could exceed the maximum value Nmax that a decoder accepts without indicating a loss of trust in the bitstream. Thus, it is preferred to insert an additional cryptographic value at the splicing point, e.g. in the first frame of the second bitstream, so that the number of frames in the groups does not exceed Nmax. Again, depending on bit-rate constraints, it may be necessary to re-encode this frame to create space for inserting the additional cryptographic value into the bitstream. As a note, the cryptographic value in this case may be copied from the first frame of bitstream 1 after the splicing point because the additional cryptographic value in the concatenated bitstream relates to the same 6 frames of bitstream 1. The data content of the frame into which the additional cryptographic value is included, however, belongs to bitstream 2 (precisely, it corresponds to the first frame of bitstream 2 after the splicing point).

The present document describes a method and system which allow the introduction of an identifier or cryptographic value into a data stream. This identifier may be used to authenticate and verify the data stream. Furthermore, the identifier may be used to ensure the correct configuration setup of the decoder for the data stream that is to be played back or processed. In particular, the method and system add additional data, i.e. an identifier, to a HE AAC bitstream which authenticates this bitstream as originating from a legitimate encoder or transmitter. This may indicate to the receiver that the HE AAC bitstream adheres to a certain specification and/or a certain quality standard. The identifier is preferably derived from an HMAC-MD5 calculation.

The method and system may be used for the authentication of multimedia files and multimedia streams and they can also detect a concatenation of several protected streams without breaking the authentication in general. This means that not a complete stream is checked for consistency but a set of consecutive frames. This supports typical broadcasting scenarios, i.e. so called "splicing", where frequently a device switches between different bitstream encoders to create the actual output stream. Furthermore, the method and system may be used to protect in-band and out-of-band information, wherein in-band information typically comprises the media data and the associated metadata, and wherein out-of-band data typically comprises configuration data. The method and system therefore allow to control and/or detect the correct playback and/or decoding of a multimedia stream.

The method and system described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the internet. Typical devices making use of the method and system described in the present document are set-top boxes or other customer premises equipment which decode audio signals. On the encoding side, the method and system may be used in broadcasting stations, e.g. in video and audio headend systems.

The invention claimed is:

1. A method for encoding a data stream comprising a plurality of data frames, the method comprising:
generating a cryptographic value of a number N of successive data frames and configuration information using a cryptographic hash function; wherein N is greater than one; wherein the configuration information comprises information for rendering the data stream;
inserting the cryptographic value into a frame of the data stream subsequent to the N successive data frames; and
iteratively generating an intermediate cryptographic value of each of the N successive frames using a starting state for the cryptographic hash function; wherein the starting state for the cryptographic hash function for generating the intermediate cryptographic value of a frame of the N successive frames is the intermediate cryptographic value of a previous frame of the N successive frames; wherein the starting state for the cryptographic hash function for generating the intermediate cryptographic value of the first frame of the N successive frames is an intermediate cryptographic value of the configuration information; wherein the cryptographic value which is inserted into a frame of the data stream subsequent to the N successive data frames is the intermediate cryptographic value of the $N^{th}$ frame; and wherein the intermediate cryptographic values of the first to $(N-1)^{th}$ frame are not inserted into the data stream.

2. The method of claim 1, wherein the method further comprises:
grouping a number N of successive data frames to form a first message; and
grouping the first message with the configuration information to form a second message;
wherein the cryptographic value is generated of the second message.

3. The method of claim 1, wherein the cryptographic value is inserted as a data stream element <DSE>; wherein the data stream element <DSE> is a syntactic element of the frame of the data stream and wherein the data stream is an MPEG4-AAC or MPEG2-AAC stream.

4. The method of claim 3, wherein a content of the data stream element <DSE> is aligned to a byte boundary of the data stream.

5. The method of claim 1, wherein the data frames are AAC or HE-AAC frames.

6. The method of claim 1, wherein the configuration information comprises at least one of:
an indication of a sampling rate;
an indication of a channel configuration of an audio coding system;
an indication of the number of samples in a data frame.

7. The method of claim 1, wherein the cryptographic value is generated using a key value.

8. The method of claim 7, wherein the step of generating a cryptographic value comprises:
calculating an HMAC-MD5 value of the number N of successive data frames and the configuration information.

9. The method of claim 8, wherein the step of generating a cryptographic value comprises
truncating the HMAC-MD5 value to yield the cryptographic value.

10. The method of claim 9, wherein the HMAC-MD5 value is truncated to 16, 24, 32, 48, 64, 80, 96 or 112 bits.

11. The method of claim 1, wherein the cryptographic value of N successive data frames is inserted into a next data frame.

12. The method of claim 1, further comprising
inserting a synchronization indication subsequent to the N successive data frames, wherein the synchronization indication indicates that the cryptographic value has been inserted.

13. The method of claim 1, wherein the steps for generating and inserting the cryptographic value are repeated for a plurality of blocks of N successive data frames.

14. The method of claim 13, wherein the cryptographic value of a block of N successive data frames is generated on the block of N successive data frames comprising the cryptographic value of a previous block of N successive data frames.

15. A non-transitory storage medium having a software program stored thereon, the software program being adapted for execution on a processor and for performing the method steps of claim 1 when carried out on a computing device.

16. A method for verifying a data stream at a decoder, the data stream comprising a plurality of data frames and a cryptographic value associated with a number N of preceding successive data frames, wherein N is greater than one, the method comprising:
generating a second cryptographic value of the number N of successive data frames and configuration information using a cryptographic hash function; wherein the configuration information comprises information for rendering the data stream;
extracting the cryptographic value from a frame of the data stream;
comparing the cryptographic value with the second cryptographic value; and
iteratively generating an intermediate second cryptographic value of each of the N successive frames using a starting state for the cryptographic hash function; wherein the starting state for the cryptographic hash function for generating the intermediate second cryptographic value of a frame of the N successive frames is the intermediate second cryptographic value of a previous frame of the N successive frames; wherein the starting state for the cryptographic hash function for generating the intermediate second cryptographic value of the first frame of the N successive frames is an intermediate second cryptographic value of the configuration information; wherein the second cryptographic value is the intermediate second cryptographic value of the $N^{th}$ frame.

17. The method of claim 16, wherein the data stream is an MPEG4-AAC or MPEG2-AAC stream; wherein the cryptographic value is extracted from a data stream element <DSE>; and wherein the data stream element <DSE> is a syntactic element of the frame of the data stream.

18. The method of claim 16, further comprising:
extracting the N successive data frames to form a first message; and
grouping the first message with the configuration information to form a second message;
wherein the second cryptographic value is generated of the second message.

19. The method of claim 16, wherein the data stream comprises a plurality of N successive data frames and associated cryptographic values and wherein the method further comprises:
determining the number N as the number of frames between two succeeding cryptographic values.

20. A non-transitory storage medium having a software program stored thereon, the software program being adapted for execution on a processor and for performing the method steps of claim 16 when carried out on a computing device.

21. An encoder operable to encode a data stream comprising a plurality of data frames, the encoder comprising:
a hardware processor operable to:
generate a cryptographic value of a number N of successive data frames, wherein N is greater than one, and configuration information using a cryptographic hash function; wherein the configuration information comprises information for rendering the data stream;
insert the cryptographic value into a frame of the data stream subsequent to the N successive data frames; and
iteratively generate an intermediate cryptographic value of each of the N successive frames using a starting state for the cryptographic hash function; wherein the starting state for the cryptographic hash function for generating the intermediate cryptographic value of a frame of the N successive frames is the intermediate cryptographic value of a previous frame of the N successive frames; wherein the starting state for the cryptographic hash function for generating the intermediate cryptographic value of the first frame of the N successive frames is an intermediate cryptographic value of the configuration information; wherein the cryptographic value which is inserted into a frame of the data stream subsequent to the N successive data frames is the intermediate cryptographic value of the $N^{th}$ frame; and wherein the intermediate cryptographic values of the first to $(N-1)^{th}$ frame are not inserted into the data stream.

22. A decoder operable to verify a data stream comprising a plurality of data frames and a cryptographic value associated with a number N of preceding successive data frames, wherein N is greater than one, the decoder comprising:
a hardware processor operable to:
generate a second cryptographic value of the number N of successive data frames and configuration information using a cryptographic hash function; wherein the configuration information comprises information for rendering the data stream;
extract the cryptographic value from a frame of the data stream;
compare the cryptographic value with the second cryptographic value; and
iteratively generate an intermediate second cryptographic value of each of the N successive frames using a starting state for the cryptographic hash function; wherein the starting state for the cryptographic hash function for generating the intermediate second cryptographic value of a frame of the N successive frames is the intermediate second cryptographic value of a previous frame of the N successive frames; wherein the starting state for the cryptographic hash function for generating the intermediate second cryptographic value of the first frame of the N successive frames is an intermediate second cryptographic value of the configuration information; wherein the second cryptographic value is the intermediate second cryptographic value of the $N^{th}$ frame.

* * * * *